Figure 1:
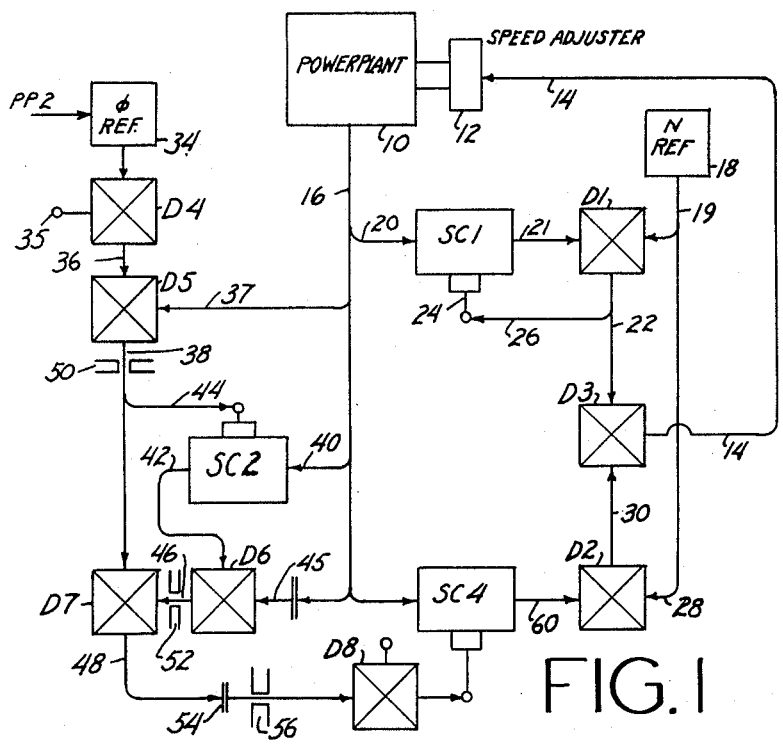

Aug. 12, 1958     W. H. CLARK, JR     2,847,617
PHASE SYNCHRONIZING SYSTEM
Filed March 28, 1957     2 Sheets-Sheet 1

INVENTOR.
WILLIAM H. CLARK JR.
BY
*Godfrey B. Speir*
ATTORNEY

Aug. 12, 1958 W. H. CLARK, JR 2,847,617
PHASE SYNCHRONIZING SYSTEM
Filed March 28, 1957 2 Sheets-Sheet 2

INVENTOR.
WILLIAM H. CLARK JR.
BY
ATTORNEY

United States Patent Office 2,847,617
Patented Aug. 12, 1958

2,847,617

PHASE SYNCHRONIZING SYSTEM

William H. Clark, Jr., Wakefield, Mass., assignor to Curtiss-Wright Corporation, a corporation of Delaware Application March 28, 1957, Serial No. 649,216

16 Claims. (Cl. 317—6)

This invention relates to control systems for rotating machinery in which it is desired or required to maintain both speed and phase at a desired value. Such systems are particularly useful where several prime movers have independent controls for speed and are required to run in speed synchronism and also in phase synchronism. For instance, in multi-engine propeller-driven aircraft, it is desired to run the engines in speed synchronism to minimize beats and cabin noise and also to control them so that the blades of the propellers all maintain a certain position relation to one another during operation to further minimize aerodynamic disturbances which create noise in the aircraft fuselage.

In speed and phase control systems of this sort, it is unnecessary to accumulate phase and speed error and then to erase the accumulation. Rather, if an engine departs from the desired phase or speed condition, the speed regulator should strive to lock the engine in at the correct speed and phase as promptly as possible.

It is axiomatic that under steady state conditions, an engine will be on speed if it is on phase, also, that phase, as well as speed, is correctible by suitable regulation of the engine speed controller. This engine speed controller may comprise a variable pitch propeller, the blade pitch of which is changed to induce a speed or phase correction. Any phase or speed error can be corrected by a suitable variation of blade pitch angle which is made to restore the desired equilibrium of the system, such equilibrium being attained a short time after the correction is made, depending upon the time lag of the rotating system in making a transition from one state of operation to another.

In my striving for a relatively simple and straightforward phase and speed control system, I fully recognized that other solutions to the problem have been proposed. Herein, however, an effort has been made to treat the problem from the standpoint of initial mathematical analysis, and then to seek instrumentalities which solve the problem most effectively. The instrumentalities are chosen and combined to yield maximum ruggedness and simplicity, and to incorporate features which make the system failsafe.

As stated previously, a suitable blade angle or speed regulator change can be made to provide a desired correction for speed error or phase error. The following relationships have been found to be applicable in the solution of the speed and phase correcting problem.

$$B = A\Delta N + b\frac{\Delta N}{S} + c\frac{\Delta N}{S^2} + d\frac{\Delta N}{S^3} \quad (A)$$

$$\overset{(1)\quad(2)\quad\quad(3)\quad\quad(4)}{\phantom{B}}$$

wherein:

B—Blade angle or speed controller setting required to attain the on-speed, on-phase operating condition
$\Delta N$—Instantaneous speed error from a desired speed
S—The differential operator $$\frac{d}{dt}$$

A—Constant in units B/R. P. S.
b—Constant in units B/second/R. P. S.
c—Constant in units B/second 2/R. P. S.
d—Constant in units B/second 3/R. P. S.

The following characteristics can be identified in regard to the terms (1), (2), (3) and (4). Term (1) represents a component of blade angle change proportional to speed error. Term (2) represents a contribution to blade angle proportional to the time integral of speed error, or the number of turns of off-speed the engine has accumulated. Terms (1) and (2) when summed and applied for speed correction provide a stable speed control. Terms (3) and (4) are integral terms, representing contributions to rate of blade angle change and define phase error and the time integral of phase error, but by themselves do not provide a stable system. The four terms together provide for phase correction and stabilized phase and speed control. The above equation may be expressed slightly differently as noted below:

$$B = \left(A\Delta N + b\frac{\Delta N}{S}\right) + \frac{1}{S}\left(c\frac{\Delta N^1}{S} + d\frac{\Delta N^1}{S^2}\right) \quad (B)$$
$$\overset{(1)\quad\quad(2)\quad\quad\quad(3)\quad\quad\quad(4)}{\phantom{B}}$$

$$B = \left(A\Delta N + b\frac{\Delta N}{S}\right) + \frac{1}{S}\left(c^1\Delta\phi + d^1\frac{\Delta\phi}{S}\right) \quad (C)$$

$$SB = (AS\Delta N + b\Delta N) + \left(c^1\Delta\phi + d^1\frac{\Delta\phi}{S}\right) \quad (D)$$

represents speed error between the powerplant and a phase reference which may be the same as or a different reference than that used for speed synchronization. It is inherent that $$c\frac{\Delta N'}{S} = c^1\Delta\phi$$

and that $$d^1\frac{\Delta\phi}{S} = d\frac{\Delta N}{S^2}$$

where $\Delta\phi$ is phase error.

Terms (1) and (2) and (B and C) above also provide for a stable proportional plus integral speed control where $\Delta N$ is speed error relative to the master, irrespectively of the phase relation.

Term (3) of (B), (C) and (D) provides an adequate phase control when the powerplants have a common speed and phase reference. Term (4) must be fulfilled to provide a definite phase reference when the phase reference and the speed reference are different instrumentalities, or when they are not synchronized relative to each other.

The invention herein is based in part upon Robbins Patent #2,667,344 issued January 26, 1954 and also comprises improvements over Clark Patent #2,771,286 issued November 20, 1956. In the Robbins patent, the principles of porportional plus integral mechanical speed control were disclosed. In the Clark patent, the same principles were improved or modified to comprehend speed trimming for synchronization and an alternative way of establishing the datum speed from which acceleration is to be sensed and at which it is desired that the power plant be operated. The present invention adds to the aforementioned inventions an effective mode for phase control of one or more powerplants. If the reference patents mentioned are referred to, it will be seen that there is a considerable similarity in the mechanical instrumentalities used in the present speed control arrangement. Similar instrumentalities are utilized in attaining the phase control trimming which is an object of this invention. It will be noted in reading both the aforementioned patents and the present specification, that all-mechanical components are preferably utilized in order to attain extreme ruggedness in the mechanisms to the end that they are very dependable.

Reference may also be made to Clark application Serial Number 572,461 filed March 19, 1956, which discloses a type of mechanical differential having multiple inputs and outputs which is adaptable for use in the present invention, which utilizes a considerable number of differential devices. For a better understanding of the invention, reference may be made to the attached drawings in connection with the reading of the detailed description following. In the drawings, Fig. 1 is a diagram of one embodiment of the invention, Fig. 2 is a diagram of another embodiment of the invention, Fig. 3 is a diagram of a third embodiment of the invention, Fig. 4 is a slightly enlarged drawing of a mechanical differential device as an example of the type of differential device which may be used in the invention and, Fig. 5 is an enlarged section through a speed changer of a type which is suitable for use in connection with the invention.

In the several figures of the drawings, a considerable number of speed changers and differentials are shown. These devices are typified by the mechanisms shown in Figs. 4 and 5. It should be understood that the practice of the invention is not limited to the use of devices shown in Figs. 4 and 5, but rather, any other suitable mechanical equivalent for these devices is applicable. In fact, by skillful and judicious design, the mechanisms shown in the diagrams of Figs. 1, 2 and 3 may be combined and condensed so that the overall systems disclosed may be extremely compact and effective. It is contemplated, in the fabrication of the systems of this invention, that the control unit as an entirety can be compacted into a single, relatively small and light-weight package which is adapted for use in connection with, for instance, aircraft powerplants.

Figure 2:
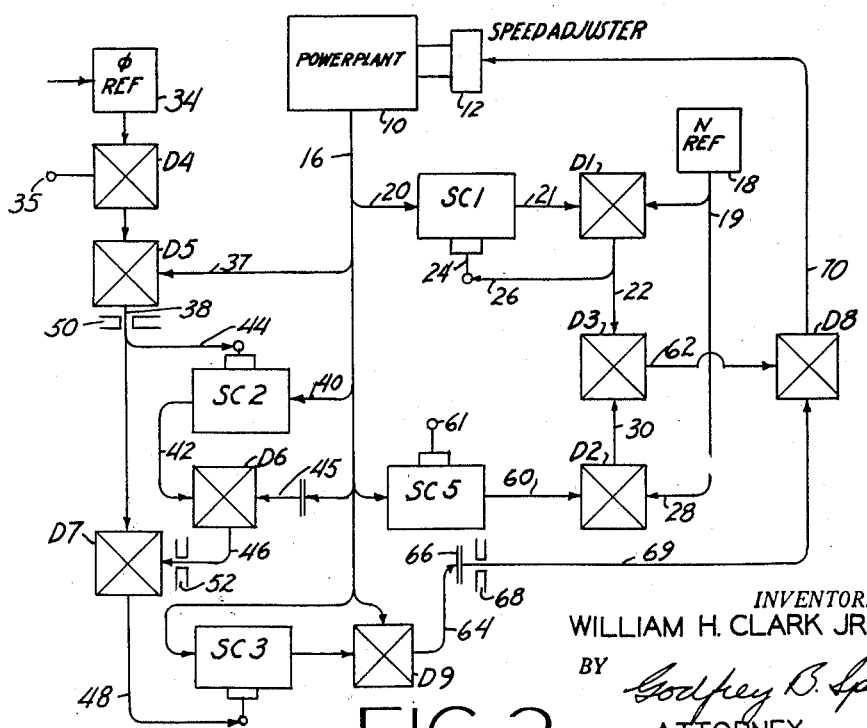
Figure 3:
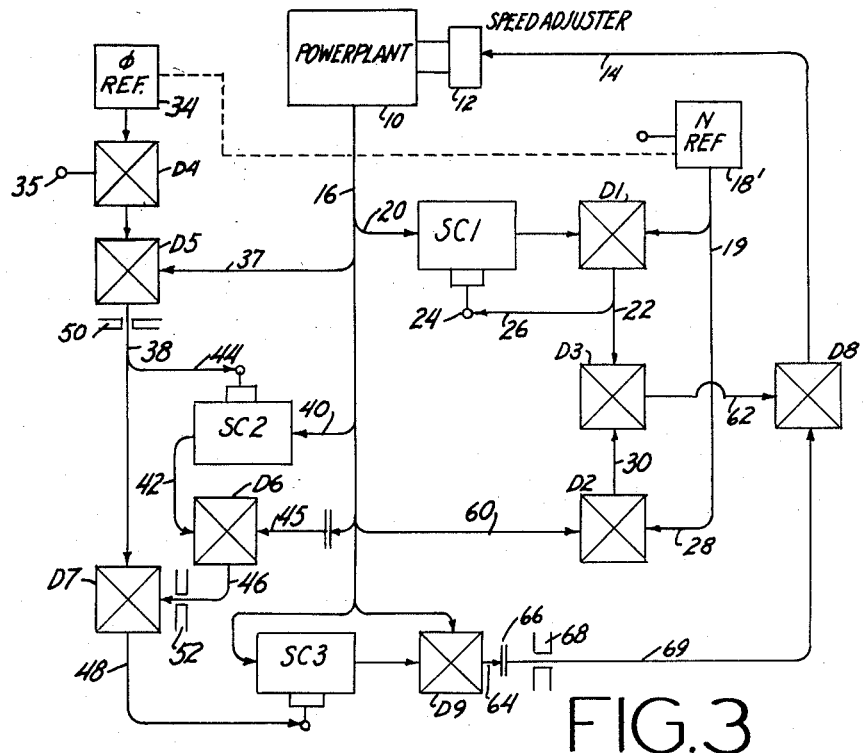
Figure 4:
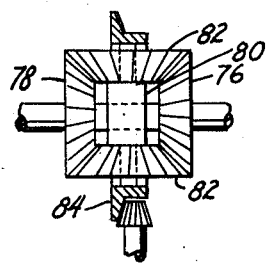
Figure 5:
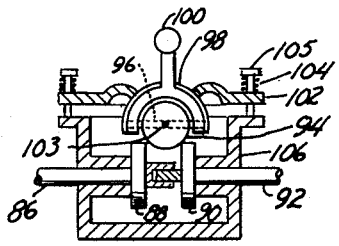

In Figs. 1, 2 and 3, differentials, such as that shown in Fig. 4, are represented by squares with a cross therein. It should be appreciated that differentials can be connected so that they either add or subtract the two inputs and produce a single output which is either the sum or difference of the inputs. Speed changers are represented by a rectangular box with an extension on one side representing the control input. Each of Figs. 1, 2 and 3 have common elements. In each figure, a powerplant is shown at 10, which is equipped with some speed regulating device 12, the nature of which is immaterial in the invention. Such speed changer may comprise a controllable pitch propeller, the blade pitch of which may be modified by a control input element 14.

The powerplant has a driven element 16 operating at a speed proportional to powerplant speed. This take-off 16 actuates a number of the speed changer and differential instrumentalities further described below. Each embodiment is provided with a reference speed device 18 or speed datum which drives an input element of a differential D1 and an input element of a differential D2 through an element 19. Element 16 includes an input 20 to speed changer 1. The other input of the differential D1 is driven by the output of speed changer 1 through an element 21. The output of differential D1 through an element 22 drives the speed adjusting element 24 of speed changer 1 through a connection 26. The output element 22 of differential D1 also drives an input of differential D3. Differential D2 includes one input which is driven at a speed which corresponds to powerplant speed. Another input to differential D2 is driven by the reference speed device 18 by element 19 through a connection 28.

The output of differential D2 drives an input of differential D3 through an element 30. The output of differential D3 drives the speed regulator 12 either directly, as in Fig. 1, or indirectly, as in Figs. 2 or 3.

The network just briefly described provides a proportional plus integral speed control for the powerplant according to the previously mentioned patents. The element 30 assumes a position at any time proportional to the time integral of the speed error of the powerplant.

The element 22 assumes a position which is proportional to the instantaneous speed error of the powerplant from reference speed. Differential D3 sums these two error components to provide, in effect, an acceleration-sensitive corrective signal which is impressed upon the speed regulator 12. The signal given to the speed regulator calls for a variation in position of the speed regulator required to restore the powerplant to an on-speed condition called for by the reference speed device 18. The functions yielded by the differentials D1, D2 and D3 and their associated mechanisms correspond to the functions $$A \Delta N + b \frac{\Delta N}{S}$$

set forth in Equation B.

To accomplish phase correction, mechanism is provided which yields the function (3) and (4) set forth in Equations A, B and C. A phase reference device is shown at 34, the output of which is a speed and phase datum to which the powerplant 10 is to be matched. This may be driven by another powerplant or by a special phase reference machine. The output of the phase reference 34 device is fed through a position-modifying differential D4 adjusted by a control 35 whose output feeds into a subtracting differential D5 at 36. The control 35 of differential D4 is a manual regulator by which the phase relationship of powerplant 10 may be adjusted for any desired phase angle with respect to the phase reference. The other input of the differential D5 comprises a connection element 37 from the powerplant driven element 16.

The differential D5, arranged for subtraction of the inputs, causes its output at 38 to assume a position according to the difference between N or powerplant phase and $N_1$, the phase reference phase. The output of differential D5 at 38 represents a function of phase error, or $c' \Delta \phi$. This is term (3) in Equation C. The position of element 38 is integrated by a speed change 2 whose input 40 is derived from the powerplant from the element 16 and whose output 42 is fed to one of the inputs of the differential D6. The ratio of the speed changer 3 is controlled by an element 44 driven by the element 38. Thus, the output 42 runs at a speed proportional to engine speed, plus or minus the speed proportional to the position of element 38. Engine speed is removed by a subtracting differential D6 whose inputs are respectively elements 42 and 45 connected to the powerplant element 16. Thus, since shaft position is proportional to the time integral of the shaft speed, the output 46 of differential D6 is positioned according to the integral of the phase error. This output 46 is fed into the differential D7 whose other input is the element 38. The differential D7 sums the two input signals and has an output 48 which represents the sum of the phase error plus the integral of the phase error.

Since the phase control system is only to exercise control on the powerplant at low speed errors, the element 38 and also the element 46 are limited in their motions by appropriate stops 50 and 52 respectively. The phase error output 48 is fed to another integrator and into the speed control system for trimming purposes as will be described.

The mechanisms just described are common to the embodiments of Figs. 1, 2 and 3, as will be clearly seen. The differences between Figs. 1, 2 and 3 are principally differences in the mode of application of the phase correction signal and the speed correction signal and their combination and application to the speed regulator 12.

In Fig. 1, the phase correcting signal is fed into a differential D8 through a slip clutch 54 and limit stops 56 which limit the magnitude of the phase trimming signal. The other input to differential D8 is a setting device for the R. P. M. at which it is desired to operate the engine. The output of the differential D8 controls speed changer 4. The input to this speed changer is engine speed and its output is a speed modified by the setting of the manual adjuster of differential D8 and by the combined phase error signal from this same differential. Thus, the output speed of speed changer 4 will represent powerplant speed modified to the order of magnitude of the speed reference 18 plus or minus a speed proportional to the phase error signals. The output of speed changer 4 at 60 comprises the other input to subtracting differential D2. The position of the output element 30 of differential D2 corresponds to the time integral of speed error between the powerplant and the speed reference plus or minus the integral of the combined phase error signals. Thus, the output element 14 of summing differential D3 combines the proportional plus integral speed error of the powerplant and also, the integrated sum of the proportional plus integral phase error. The integration of the proportional plus integral phase error is accomplished through speed changer 4. From the foregoing, it will be seen that the element 14 includes all of the factors of Equations A, B or C which are required to provide stabilized speed and phase control for the powerplant.

It has been found that while the arrangement of Fig. 1 can be effectively constructed, some difficulty can arise in the choice and the actual reduction to practice of the various sensitivity ratios and cofficients which are required in the entire system. These ratios are afforded by gear ratios, not shown, between the inputs and outputs of the several differentials and speed changers. This results principally from the insertion of the phase error control output through that part of the system by which the speed of the engine is selected in the speed changer 4.

In Fig. 2, this deficiency is largely overcome.

Attention is now invited to Fig. 2 wherein the combining of the final speed control and phase control signals is accomplished through the use of a differential D8.

In the Fig. 2 arrangement, the proportional plus integral speed control arrangements comprising the differentials D1, D2, D3 and the speed changer 1 are the same as previously described. However, speed changer 5 is inserted between the powerplant and the differential D2 which includes a manual setting device 61 by which a selected speed for the powerplant may be chosen. Thus, the output of speed changer 5 will be a speed equivalent to reference speed plus or minus any error in speed between powerplant speed and the constant reference speed produced by the device 18. The output of differential D3 at 62 will thus be the proportional plus integral speed error. This is fed as one input to the summing differential D8.

The output of differential D7 in the phase control part of the system represents phase error plus the integral of the phase error. This is utilized to control a speed changer 3, the input of which is engine speed and the output of which is proportional to $$\Delta\phi + \frac{\Delta\phi}{S}$$

plus engine speed. In order to secure the time integrated phase function without engine speed in it, the output of speed changer 3 is inserted in a subtracting differential D9 whose other input is engine speed. This subtracting differential thus has an output at 64 positioned according to the time integral of phase error plus the double time integral of the phase error. This signal is passed through a slip clutch 66 and position or range limit stops 68 to the second input 69 of the differential D8. This differential D8 sums, then, the speed control signals and the phase control signals, and passes them through a connection 70 to the powerplant speed regulator 12.

In this arrangement, the necessary ratio constants for proper sensitivity of the integral plus proportional speed regulation system can be isolated from the ratios needed for proper sensitivity of the phase regulating system. The two combined signals for speed and phase are combined in the differential D8.

Reference may now be made to Fig. 3. This arrangement is much like the arrangement shown in Fig. 2. The combined integrated phase control signal is passed from the element 64 through the clutch 66, and between limit stops 68 to the summing differential D8 through element 69, as in Fig. 2. The proportional plus integral speed control system utilizes an adjustable speed reference 18′ which may be used as a control for engine speed. This replaces speed changer 5 as shown in Fig. 2. Otherwise, the arrangement of this system is as has been explained previously.

The Fig. 3 arrangement is useful where a plurality of powerplants are synchronized with respect to a master speed and phase reference. In this instance, the variable speed reference 18′ and the phase reference 34 may be coupled or combined. Alternatively, the master speed reference 18′ may be utilized for the several powerplants, but the phase reference may be taken from any one of the several powerplants.

In fact, in the three embodiments shown, it is preferable to take the phase reference from one of several powerplants so that unnecessary phase error signals are not generated when all of them drift transiently in speed, jointly, from a master speed reference or from individual speed references.

Fig. 4 shows a typical differential which includes face gears 76 and 78, a spider 80 carrying spider pinions 82, and a ring gear 84 which is secured to rotate with spider 80. The three elements 76, 78 and 84 can be arranged in any order to provide two inputs and one output. Other differential arrangements are feasible where the motion of the elements involved is small. Namely, a lever can be used having three pivots, each movable with a suitable input or output link.

Fig. 5 shows a typical speed changer comprising an input shaft 86, carrying a friction wheel 88, this facing a friction wheel 90 secured to an output shaft 92. Running on the rims of the friction wheels 88 and 90 is a ball 94 carried on a shaft 96, the shaft being mounted in a tiltable yoke 98 adjustable by a control element 100. The yoke 98 is swingable with respect to a housing member 102 on an axis 103 tangential to the wheels. The member 102 is spring loaded at 104 against elements 105 on a main housing 106 of the unit to provide the force to afford adequate friction to take care of the driving torque of the transmission.

In the neutral position; namely, the vertical position of the member 100 as shown, the ratio of the transmission is one to one. When the adjusting element 100 is tilted to one side or the other of the vertical, the ratio of the transmission becomes other than one to one in either direction.

The arrangements of Figs. 1, 2 and 3 are considered to be adequate to show the principles of the invention, but application of these principles is by no means limited to the arrangements shown. It should be clear that the various differentials and speed changers may be redisposed with respect to each other, while still securing the same end results.

In considering the Equations A, B and C set forth toward the beginning of this specification, it should be realized that Terms (1) and (2) of these equations provide a stable speed control. However, Terms (3) and (4) of and by themselves do not necessarily provide stable speed control, nor do they when integrated, but rather, they serve to modify the stabilized speed control of Terms (1) and (2) to attain phase correction of the system.

The speed reference 18 or 18′ in any of the systems disclosed may be derived from a governor or from a master speed reference motor, or from a governor controlled master powerplant to which the other powerplants are slaved.

The phase reference 34, as previously mentioned, may be separate from or combined with the speed reference. Preferably, though not necessarily, one of several powerplants is not phase controlled and provides a master phase reference in the form of an A. C. alternator. The other powerplant control systems include synchronous motors which are electrically coupled to the A. C. alternator. These motors are the phase reference motors 34.

Another arrangement for the phase references of each powerplant, which can be used in the present invention, is that described in copending Chillson application Serial Number 644,315 filed March 6, 1957.

While I have disclosed my invention in several embodiments which are practical and feasible, it is to be understood that various modifications and rearrangements in the invention may be made. I aim, in the appended claims, to cover all of such reasonable modifications and changes.

I claim:

1. In a synchronizing system for a plurality of powerplants, each powerplant having a speed regulator, stabilized means for each powerplant responsive to the speed thereof and to a desired speed having an output connected to the respective speed regulator, and operable to control the speed regulator to urge the powerplant toward speed synchronism with other powerplants, said powerplants having interconnected phase reference rotors jointly rotating in phase synchronism, each powerplant having a phase trimming control mechanism comprising a subtracting differential driven by a phase reference rotor and the powerplant having an output positioned according to phase error, an integrator for said phase error, means to sum the phase error and the integrated phase errors, means to integrate the summed phase errors, and differential means to insert the thus integrated phase errors in the operating connection from said stabilized means to said speed regulator.

2. A system according to claim 1, including a slippable clutch connection and limit stops between said combined phase error integrator and said operating connection.

3. A system according to claim 1 wherein said integrators comprise speed changers driven by said powerplant and adjustable as to speed change ratio by the outputs of said subtracting differential and summing differential respectively.

4. A system according to claim 1 including means connected to said subtracting differential to modify the phase signal from said phase reference rotor by a desired angular relationship.

5. In combination with a plurality of powerplants each having a speed regulator, speed controlling means operable to adjust respective regulators to cause said powerplants to operate at a desired speed, a master phase reference generator driven by one of said powerplants, slave phase motors at each other powerplant driven by said generator, said generator and motors rotating at a speed proportional to the speed of said one powerplant, a trimming differential in the drive train of said speed control means to each regulator of said other powerplants, each other powerplant including a phase error controlling arrangement comprising mechanical means to compare phase motor phase and powerplant phase having an output member positioned according to phase error, a mechanical integrator driven by said output member having an output element positioned according to the time integral of phase error, means associated with each said output element and member to limit the movement thereof to certain maximum limit positions, a differential driven by said output member and output element to sum the positions thereof and including a driven element, an integrator to integrate the position of said driven element, and a driving connection from said integrator to said trimming differential.

6. In a speed and phase control system for a powerplant including a speed regulator, a speed take-off from the powerplant, a phase reference, a speed reference, means to derive from the speed reference and from said take-off, a differential function thereof and a direct function thereof, means to combine said direct and differential functions producing a combined speed error signal, means to derive from said phase reference and said take-off an integral function and a double integral function of speed error, second means to combine said integral and double integral functions, said second combining means having a combined phase error output signal, means to limit the magnitude of said phase error output signal, and means to combine said phase error output signal with said speed error signal to operate said speed adjuster.

7. In a speed and phase control system for a powerplant including a speed regulator, a speed take-off from the powerplant, means to derive therefrom the speed error and the phase error between powerplant speed and a desired speed and phase, means to derive from the speed error an integral function thereof, means to derive from the phase error an integral function thereof, means to derive from the phase error a double integral function thereof, means to combine said phase integral and double integral functions into a combined phase error signal, means to limit the magnitude of said combined phase error signal, means combining the limited combined phase error signal with said speed error and with the integral function of said speed error, and an operating connection from said latter combining means to said speed regulator.

8. In a speed and phase control system for a powerplant including a speed regulator, a speed take-off from the powerplant, a speed reference, speed control means comparing the speed of said take-off against the speed reference having a speed error output connected to control said speed regulator, said speed control means including a computer to compute and combine the integral of speed error and the speed error itself, a phase reference, phase control means comparing the phase of said take-off against the phase reference, having a phase error output, said phase control means including a phase computer to combine and compute said phase error in terms of the integral and the double integral of speed error, means to limit the magnitude of the output from said phase computer, and means to insert the limited output of said phase computer into said speed control means.

9. In a speed and phase control system for a powerplant having a speed regulator, a speed control means having one limb comparing powerplant speed and a desired speed productive of a speed error output in terms of R. P. M. in powerplant difference from a desired R. P. M., said speed control means comprising another limb which includes means to derive an output which is the integral of the speed error, and means to combine said two outputs and to operate said speed regulator thereby; a phase control means having one limb comparing powerplant phase and a desired phase productive of an error signal in terms of the double integral of speed error, and another limb productive of an error signal in terms of the triple integral of speed error, means to combine and limit the output of the limbs of said phase control means, and means to insert the combined limited output into one of the limbs of said speed control means.

10. A phase error sensing and control system for use with a stabilized speed control for a powerplant having a speed control signal, comprising a phase reference rotor, a differential comparing rotor and powerplant phase relation productive of a phase error signal, mechanical computing means driven by said signal and powerplant producing a phase error output signal comprising the sum of the time integral of phase error and the double integral of phase error relative to time, and means to mix said phase error output signal with the stabilized speed control signal to said powerplant.

11. A system according to claim 10 comprising means to limit the magnitude of said phase error output signal which is mixed with said speed control signal.

12. A system according to claim 10 including means associated with said phase reference rotor adjustable to vary the datum phase relation between said rotor and powerplant.

13. A phase error sensing and control system for use with a stabilized speed control for a powerplant having a speed control signal, comprising a phase reference rotor, a differential driven by said rotor and powerplant producing a first phase error signal, a speed changer driven by said powerplant having a speed ratio adjuster actuated by said first signal, a second differential driven by said speed changer and by said powerplant producing an output comprising a second phase error signal, a summing differential fed by said first and second phase error signals having as an output a combined third phase error signal, and means to time-integrate said third phase error signal and to mix the time-integrated signal with said speed control signal.

14. A system according to claim 13 including means to limit the magnitude of said time-integrated phase signal.

15. A system according to claim 13, wherein said means to time-integrate said third phase error signal comprises a speed changer driven by said powerplant and adjusted as to ratio by said third phase error signal.

16. A system according to claim 15 wherein said time-integrated third phase error signal and said speed control signal are mixed in a summing differential having an output connected to control powerplant speed.

References Cited in the file of this patent

UNITED STATES PATENTS

| | | |
|---|---|---|
| 2,667,344 | Robbins | Jan. 26, 1954 |
| 2,771,286 | Clark | Nov. 20, 1956 |